United States Patent Office 2,809,197
Patented Oct. 8, 1957

2,809,197

HEAVY METAL COMPLEXES OF PYRIDINE-2,5-DICARBOXYLIC ACID ESTERS

Carl W. Kruse, Bartlesville, and Merrill Schnitzer, Dewey, Okla., assignors to Phillips Petroleum Company, a corporation of Delaware No Drawing. Application September 21, 1954,
Serial No. 457,568

15 Claims. (Cl. 260—270)

METAL SALT-PYRIDINE CARBOXYLIC ACID ESTER COMPOUNDS, AND THEIR PREPARATION

This invention relates to new compounds. In one aspect this invention relates to the preparation of such new compounds. In another aspect this invention relates to preparation of new compounds by interacting a salt of a metal of group 2B of the periodic system with an ester of a pyridine carboxylic acid. In still another aspect, this invention relates to new compounds, namely, complexes of salts of metals of group 2B of the periodic system and esters or one-half esters of pyridine-2,5-dicarboxylic acid or esters of pyridine monocarboxylic acids. In another aspect this invention relates to a preferred group of new complexes, namely, (1) a complex of $HgCl_2$ with di-n-propyl ester of pyridine-2,5-dicarboxylic acid, (2) $HgCl_2$ with the diethyl ester of pyridine-2,5-dicarboxylic acid, (3) $ZnCl_2$ with di-n-propyl ester of pyridine-2,5-dicarboxylic acid, (4) $ZnCl_2$ with the diethyl ester of pyridine-2,5-dicarboxylic acid, (5) $CdCl_2$ with di-n-propyl ester of pyridine-2,5-dicarboxylic acid, and (6) $CdCl_2$ with the diethyl ester of pyridine-2,5-dicarboxylic acid. In still another aspect this invention relates to preparation of complexes of a specific group of the novel complexes of this invention by (1) reacting $HgCl_2$ with the di-n-propyl ester of pyridine-2,5-dicarboxylic acid, (2) reacting $HgCl_2$ with the diethyl ester of pyridine-2,5-dicarboxylic acid, (3) reacting $ZnCl_2$ with the di-n-propyl ester of pyridine-2,5-dicarboxylic acid, (4) reacting $ZnCl_2$ with the diethyl ester of pyridine-2,5-dicarboxylic acid, (5) reacting $CdCl_2$ with the di-n-propyl ester of pyridine-2,5-dicarboxylic acid, and (6) reacting $CdCl_2$ with the diethyl ester of pyridine-2,5-dicarboxylic acid.

Complexes of mercuric chloride and esters of pyridine-2,5-dicarboxylic acid as components of bactericides, and method for their utilization are disclosed and claimed in the co-pending application of Charles W. Osborn et al., Serial No. 457.564, filed September 21, 1954.

In accordance with this invention, new compounds are provided which are complexes of salts of metals of group 2B of the periodic system and esters of pyridine carboxylic acids, the said esters being diesters, one-half esters, or monocarboxylic acid esters characterized by a structural formula of the group

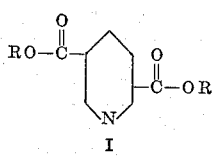

I and

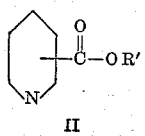

II wherein in the said Formula I each R is selected from the group consisting of alkyl, aryl, alkenyl, and H with not more than one R as H, and wherein in said Formula II R' is of the group consisting of alkyl, aryl, and alkenyl, with each R and R', containing up to 16 carbon atoms.

Also in accordance with this invention is provided a process for preparation of the new compounds set forth hereinabove, comprising the steps of reacting a salt of a metal of group 2B of the periodic system with an ester of a pyridine carboxylic acid, the said ester being characterized by a structural formula of the group

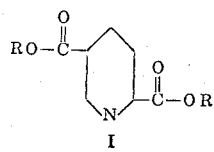

I and

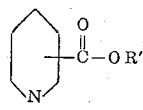

II wherein in the said Formula I each R is selected from the group consisting of alkyl, aryl, alkenyl, and H with not more than one R as H, and wherein in said Formula II R' is of the group consisting of alkyl, aryl, and alkenyl, with each R, and R', containing up to 16 carbon atoms.

In a preferred form, the reaction is carried out in the presence of a suitable solvent chemically inert under the conditions of said reaction.

In one embodiment, the metal salt reactant is dissolved in a suitable solvent, generally with some heating, and then the pyridine carboxylic acid ester reactant is added to the resulting solution, and the then resulting solution is heated, preferably under reflux temperature of the solvent such as under total reflux at atmospheric pressure. Upon effecting the desired reaction, the resulting reaction mixture is cooled, and the metal salt-pyridine carboxylic acid ester complex product is crystallized and recovered.

Although it is generally preferred to conduct the process of this invention employing a solvent under solvent reflux conditions, the process reaction can be conducted in a closed system under non-refluxing conditions when desired, thus, if desired, the reactants together with solvent, can be introduced into a reaction bomb and the reaction carried out in the sealed bomb at a temperature generally within the range of 0 to 500° F. for a period of time of from 1 to 500 minutes.

When the reaction is conducted at a temperature above the normal boiling point of the solvent or other liquid which may be present, a pressure sufficient to maintain the solvent substantially in the liquid phase will be employed.

We have found that the above conditions of time, temperature, and pressure can be employed in any desired combination in carrying out the process of our invention regardless of whether under total reflux, partial reflux, or non-refluxing conditions.

When the pyridine carboxylic acid ester reactant is a liquid such as di-n-propyl ester of pyridine-2,5-dicarboxylic acid, it is not necessary that a solvent for the reaction be employed although generally even when employing a normally liquid ester reactant a suitable inert solvent is utilized.

Exemplary of metal salt reactants of this invention are $HgCl_2$, $CdCl_2$, $ZnCl_2$, $HgI_2$, $CdI_2$, $ZnI_2$, $HgBr_2$, $CdBr_2$, $ZnBr_2$, $HgSO_4$, $CdSO_4$, $ZnSO_4$, $Hg(NO_3)_2$, $Cd(NO_3)_2$ and $Zn(NO_3)_2$.

Exemplary of the pyridine carboxylic acid ester reactants of this invention are: methyl ester of pyridine-2-carboxylic acid; n-propyl ester of pyridine-3-carboxylic acid; n-hexadecyl ester of pyridine-4-carboxylic acid; tolyl ester of pyridine-2-carboxylic acid; naphthyl ester of pyridine-3-carboxylic acid; phenyl ester of pyridine-4-carboxylic acid; dimethyl ester of pyridine-2,5-dicarboxylic acid; diisopropyl ester of pyridine-2,5-dicarboxylic acid; di-tert-butyl ester of pyridine-2,5-dicarboxylic acid; diisooctyl ester of pyridine-2,5-dicarboxylic acid; di-n-hexadecyl ester of pyridine-2,5-dicarboxylic acid; diallyl ester of pyridine-2,5-dicarboxylic acid; di-n-pentenyl ester of pyridine-2,5-dicarboxylic acid; di-n-hexadecenyl ester of pyridine-2,5-dicarboxylic acid; diphenyl ester of pyridine-2,5-dicarboxylic acid; dibenzyl ester of pyridine-2,5-dicarboxylic acid; ditolyl ester of pyridine-2,5-dicarboxylic acid; dixylyl ester of pyridine-2,5-dicarboxylic acid; n-propyl, ethyl, diester of pyridine-2,5-dicarboxylic acid; allyl, pentenyl, diester of pyridine-2,5-dicarboxylic acid; n-hexadecyl, tolyl, diester of pyridine-2,5-dicarboxylic acid; isooctyl, xylyl, diester of pyridine-2,5-dicarboxylic acid; n-hexadecenyl, isopropyl, diester of pyridine-2,5-dicarboxylic acid; methyl, benzyl, diester of pyridine-2,5-dicarboxylic acid; xylyl-n-propyl diester of pyridine-2,5-dicarboxylic acid; methyl, hexadecyl, diester of pyridine-2,5-dicarboxylic acid; 2-methyl ester of pyridine-2,5-dicarboxylic acid; 5-allyl ester of pyridine-2,5-dicarboxylic acid; 2-n-hexadecyl ester of pyridine-2,5-dicarboxylic acid, 2-isooctyl ester of pyridine-2,5-dicarboxylic acid; 5-xylyl ester of pyridine-2,5-dicarboxylic acid; 2-tert-butyl ester of pyridine-2.5-dicarboxylic acid; and 5-isooctenyl ester of pyridine-2,5-dicarboxylic acid.

Illustrative of metal salt-pyridine carboxylic acid ester complex compounds of our invention are: HgCl₂.methyl ester of pyridine-2-carboxylic acid; HgCl₂.n-propyl ester of pyridine-3-carboxylic acid; HgCl₂.isooctyl ester of pyridine-4-carboxylic acid; HgCl₂.n-hexadecenyl ester of pyridine-2-carboxylic acid; HgSO₄.isooctenyl ester of pyridine-4-carboxylic acid; Hg(NO₃)₂.phenyl ester of pyridine-3-carboxylic acid; CdI₂-tert-butyl ester of pyridine-2-carboxylic acid; ZnBr₂.n-pentenyl ester of pyridine-3-carboxylic acid; HgCl₂.di-n-propyl ester of pyridine-2,5-dicarboxylic acid; HgCl₂.diethyl ester of pyridine-2,5-dicarboxylic acid; CdCl₂.di-n-propyl ester of pyridine-2,5-dicarboxylic acid; CdCl₂.diethyl ester of pyridine-2,5-dicarboxylic acid; ZnCl₂.di-n-propyl ester of pyridine-2,5-dicarboxylic acid; ZnCl₂.diethyl ester of pyridine-2,5-dicarboxylic acid; HgCl₂.dihexadecyl ester of pyridine-2,5-dicarboxylic acid; CdCl₂.dihexadecyl ester of pyridine-2,5-dicarboxylic acid; ZnCl₂.dihexadecenyl ester of pyridine-2,5-dicarboxylic acid; HgCl₂.diisopropyl ester of pyridine-2,5-dicarboxylic acid; CdCl₂.diphenyl ester of pyridine-2,5-dicarboxylic acid; ZnCl₂.dinaphthyl ester of pyridine-2,5-dicarboxylic acid; HgBr₂.dihexadecenyl ester of pyridine-2,5-dicarboxylic acid; CdBr₂.diduodecyl ester of pyridine-2,5-dicarboxylic acid; ZnBr₂.diocenyl ester of pyridine-2,5-dicarboxylic acid; ZnI₂.dimethyl ester of pyridine-2,5-dicarboxylic acid; HgCl₂.n-propyl-ethyl diester of pyridine-2,5-dicarboxylic acid; CdCl₂.allyl isooctenyl diester of pyridine-2,5-dicarboxylic acid; ZnCl₂.n-hexadecyl-isopropyl diester of pyridine-2,5-dicarboxylic acid; HgCl₂.n-propyl, ethyl diester of pyridine-2,5-dicarboxylic acid; HgI₂.xylyl, n-propyl diester of pyridine-2,5-dicarboxylic acid; HgSO₄.methyl, hexadecyl diester of pyridine-2,5-dicarboxylic acid; Zn(NO₃)₂.n-octyl, n-propyl diester of pyridine-2,5-dicarboxylic acid; CdSO₄.n-propyl, hexadecyl diester of pyridine-2,5-dicarboxylic acid; HgCl₂.hexadecyl, dodecyl diester of pyridine-2,5-dicarboxylic acid; CdCl₂.hexadecyl, dodecyl diester of pyridine-2,5-dicarboxylic acid; ZnSO₄.hexadecenyl-isooctenyl diester of pyridine-2,5-dicarboxylic acid; HgCl₂.2-methyl ester of pyridine-2,5-dicarboxylic acid; HgCl₂.2-n-propyl ester of pyridine-2,5-dicarboxylic acid; HgCl₂.2-tolyl ester of pyridine-2,5-dicarboxylic acid; HgBr₂.2-phenyl ester of pyridine-2,5-dicarboxylic acid; HgI₂.2-n-hexadecenyl ester of pyridine-2,5-dicarboxylic acid; CdCl₂.2-ethyl ester of pyridine-2,5-dicarboxylic acid; CdCl₂.5-naphthenyl ester of pyridine-2,5-dicarboxylic acid; CdSO₄.2-isooctyl ester of pyridine-2,5-dicarboxylic acid; ZnCl₂.2-ethyl ester of pyridine-2,5-dicarboxylic acid; ZnCl₂.5-n-hexadecenyl ester of pyridine-2,5-dicarboxylic acid; ZnSO₄.2-isopropyl ester of pyridine-2,5-dicarboxylic acid; ZnBr₂.2-xylyl ester of pyridine-2,5-dicarboxylic acid; and ZnI₂.n-hexadecenyl pyridine-2,5-dicarboxylic acid.

The complexes of our invention contain equimolar proportions of the metal salt and the ester components, the metal salt component being directly associated with the nitrogen atom. Thus, by way of illustration of specific complexes of this invention, these complexes are represented by structural formulas such as

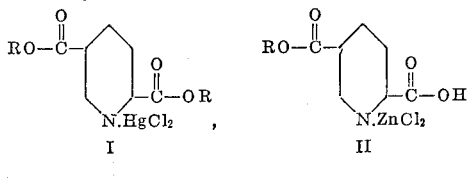

and

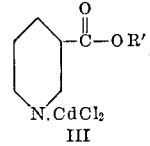

wherein the R and R' values are those of the ester reactants defined hereinabove.

The complexes of this invention and method for their preparation are further illustrated with reference to a specific equation setting forth the type reaction that is believed to take place. Although HgCl₂ is the salt reactant shown, it is understood that salts of other metals of group 2B, such as ZnCl₂ and CdCl₂ can also be employed:

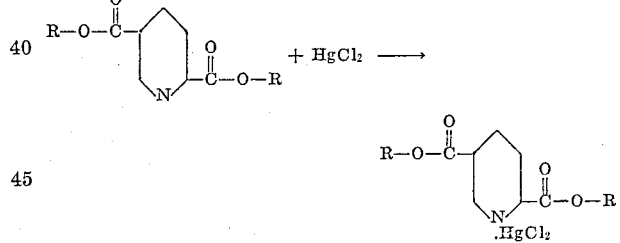

wherein in each of the above formulas R is as above defined with reference to the ester reactant.

Now preferred complexes of this invention are (1) the complex of HgCl₂ and the diethyl ester of 2,5-dicarboxylic acid, (2) HgCl₂ and the di-n-propyl ester of pyridine-2,5-dicarboxylic acid, (3) the complex of ZnCl₂ and the diethyl ester of pyridine-2,5-dicarboxylic acid, (4) the complex of CdCl₂ and the diethyl ester of pyridine-2,5-dicarboxylic acid, and (5) the complex of HgCl₂ and the ethyl ester of pyridine 3-monocarboxylic acid (ethyl nicotinate).

Exemplary of inert solvents employed in carrying out the process of this invention are normally liquid alcohols, ketones, ethers, esters, and chlorinated hydrocarbons. It is generally preferred that these solvents contain from about 1 to 10 carbon atoms in a molecule. Exemplary of preferred solvents are methyl alcohol, ethyl alcohol, n-propyl alcohol, t-butyl alcohol, acetone, methyl ethyl ketone, methyl isobutyl ketone, di-n-propyl ether, diethyl ether, carbon tetrachloride and ethyl acetate.

The complexes of this invention may exhibit utility as insect repellents, bactericides, fungicides, pharmaceuticals and cosmetics.

Our invention is illustrated by way of the following examples:

*Example I*

The mercuric chloride complex of the diethyl ester of pyridine-2,5-dicarboxylic acid was made in the following manner: 6.8 grams, 0.025 mol, of mercuric chloride was dissolved by heating the salt in 20 ml. of absolute ethyl alcohol. To this solution was added 5.58 grams, 0.025 mol, of the diethyl ester of pyridine-2,5-dicarboxylic acid dissolved in 10 ml. of absolute ethyl alcohol. Crystals formed rapidly, and the entire contents set up into a solid mass. This solid mass was cooled, and 10 ml. of additional absolute ethyl alcohol was added. The product was then filtered, washed with 20 ml. of absolute ethyl alcohol, and dried overnight at 70° C. The yield of the mercuric chloride complex of the diethyl ester of pyridine-2,5-dicarboxylic acid was found to be 10.4 grams, representing an 84 percent yield. The melting point of the product was found to be 132–134° C. The product was found to be soluble in acetone, hot methyl alcohol, ethyl acetate, and ethyl alcohol and hot water, but it was found to be insoluble in cold water.

*Example II*

The mercuric chloride complex of the di-n-propyl ester of pyridine-2,5-dicarboxylic acid was prepared in the following manner: 7.1 grams (0.026 mol) of mercuric chloride was dissolved in 30 ml. of absolute ethyl alcohol and to this was added 6.6 grams (0.026 mol) of the di-n-propyl ester of pyridine-2,5-dicarboxylic acid. It was not necessary to dissolve the ester as the di-n-propyl ester of pyridine-2,5-dicarboxylic acid is normally a liquid. The solution was then heated to boiling, cooled, and seeded to induce crystallization. The product was then filtered out and washed with 30 ml. of cold absolute ethyl alcohol. The yield of product was 10.2 grams, representing 70 percent of the theoretical yield. The product was recrystallized from absolute ethyl alcohol and the melting point of this recrystallized product was found to be 80–82° C. The product was found to be soluble in methyl alcohol, acetone, ethyl acetate, and ethyl alcohol, and was also found to be insoluble in water and chloroform.

An 0.522 gram sample of the mercuric chloride complex of pyridine-2,5-dicarboxylic acid was titrated with 0.1010 N perchloric acid, and the molecular weight was found to be 523, indicating a ratio of ester to salt of 1:1.

*Example III*

A solution of zinc chloride was prepared by dissolving 3.4 grams (0.025 mol) of this salt in 20 mls. of ether. To this solution was added 5.8 grams (0.025 mol) of the diethyl ester of pyridine-2,5-dicarboxylic acid (melting point 46–50 C.) dissolved in 10 ml. of ether. These solutions were mixed and the product crystallized out rapidly. This product was cooled, filtered, and washed with 30 ml. of fresh ether. The product was then dried overnight at 70° C., and the yield was found to be 7.7 grams, representing 86 percent of the theoretical yield. The crude melting point of this product was found to be 193–196° C. A pure product was made by recrystallizing the crude product from a mixture of n-butyl ether and absolute ethyl alcohol. This pure product had a melting point of 200–203° C. and was found to decompose in water. The product was found to be soluble in acetone, chloroform, methyl alcohol, and ethyl alcohol, but was found to be insoluble in ether and carbon tetrachloride.

*Example IV*

A solution of zinc chloride was made up by dissolving 3.4 grams (0.25 mol) of the salt in 30 ml. of ether. To this solution was added 6.3 grams (0.025 mol) of the di-n-propyl ester of pyridine-2,5-dicarboxylic acid. Heat was evolved in this reaction which caused the ether to boil vigorously. The solution was then cooled in a refrigerator for one hour, and the product which was recovered by filtration was washed in 10 ml. of ice cold ether. After drying at 70° C. for one hour, the product was weighed and the yield found to be 7.5 grams, representing a yield of 77 percent. This product was found to have a melting point of 153–157° C. The product was found to be soluble in acetone, chloroform, methyl alcohol, ethyl alcohol, but was found to be only slightly soluble in ether. The product decomposed in water. The complex formed above was titrated with 0.1010 normal perchloric acid in glacial acetic acid to determine the ratio of salt to ester. A color indicator showed that the compound was a very weak base, and for this reason the titration was carried out using a millivolt scale and averaging the inflection points. The average of the titrations indicated a molecular weight of 397, while the calculated molecular weight for a 1:1 molar ratio of ester to salt is 387.

These new compounds are also useful as a means for purifying the esters from which these complexes are formed. In purifying these esters, the heavy metal complex is formed and precipitated, after which the complex can be decomposed back to the pure ester.

The complexes of HgCl₂ with esters of pyridine-2,5-dicarboxylic acid exhibit especial utility as bactericides, particularly as applied to *Escherichia coli*, Pseudomonas specie, *Bacillus subtilis*, *Serratia marcescens*, *Proteus vulgaris*, *Klebsiella pneumoniae*, *Aerobacter aerogenes*, *Staphylcoccus aureus*, Sarcina specie, and *Bacillus cereus*, as disclosed in the copending application of Charles W. Osborn et al., referred to hereinabove.

Reasonable variation and modification are possible within the scope of the foregoing disclosure and the appended claims to the invention, the essence of which is that new compounds, namely complexes of group 2B metal salts and certain pyridine carboxylic acid esters have been provided; and that a method has been provided for preparation of these compounds comprising reacting such a metal salt with a pyridine carboxylic acid ester; now preferred complexes of this invention being those of the group 2B metal salts and the diethyl and di-n-propyl esters of pyridine-2,5-dicarboxylic acid, the ethyl ester of pyridine-3-carboxylic acid, and the 2-ethyl ester of pyridine-2,5-dicarboxylic acid, as described.

We claim:

1. As a new compound a complex of an inorganic salt of mercury of and an ester of a pyridine carboxylic acid, the said ester being characterized by a structural formula of the group

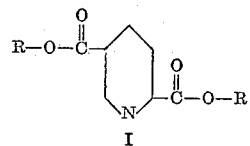

I and

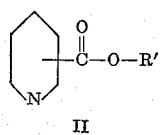

II wherein in said Formula I each R is selected from the group consisting of alkyl, aryl, alkenyl and H, with not more than one R as H, and wherein in the said Formula II R′ is of the group consisting of alkyl, aryl and alkenyl, there being up to 16 carbon atoms in any one of the said R's, and in R′.

2. As a new compound,

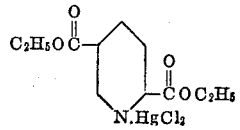

3. As a new compound,

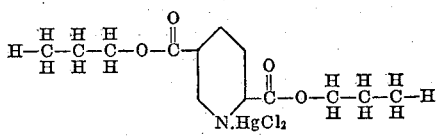

4. A new compound of claim 1 wherein said inorganic metal salt is HgCl₂.

5. As a new compound,

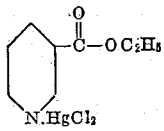

6. A compound comprising a complex prepared by reacting an inorganic salt of mercury with an ester of a pyridine carboxylic acid, the said ester being characterized by a structural formula of the group

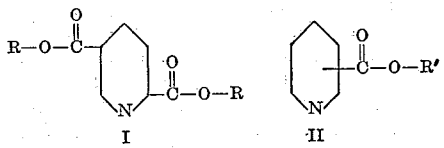

where in said Formula I each R is selected from the group consisting of alkyl, aryl, alkenyl and H, with not more than one R as H, and wherein in the said Formula II R' is of the group consisting of alkyl, aryl and alkenyl, there being up to 16 carbon atoms in any of the said R's and in R'.

7. A process for preparation of a metal salt-pyridine carboxylic acid ester complex, comprising reacting an inorganic salt of a divalent metal with an ester of a pyridine carboxylic acid characterized by a structural formula of the group

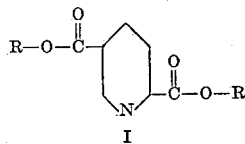

and

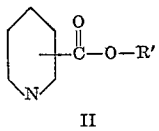

wherein in said Formula I each R is selected from the group consisting of alkyl, aryl, alkenyl and H, with not more than one R as H, and wherein in the said Formula II R' is of the group consisting of alkyl, aryl and alkenyl, there being up to 16 carbon atoms in any one of the said R's, and in R'.

8. A process for preparation of a metal salt-pyridine carboxylic acid ester complex, comprising reacting an inorganic salt of a metal of group 2B of the periodic system with an ester of a pyridine carboxylic acid characterized by a structural formula of the group

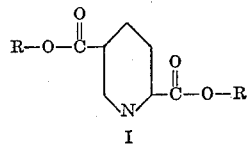

and

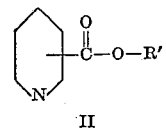

wherein in said Formula I each R is selected from the group consisting of alkyl, aryl, alkenyl and H, with not more than one R as H, and wherein in the said Formula II R' is of the group consisting of alkyl, aryl and alkenyl, there being up to 16 carbon atoms in any one of the said R's, and in R'.

9. A process of claim 8 wherein said inorganic metal salt and said ester reactant are maintained in a normally liquid solvent chemically inert under the reaction conditions at a temperature within the range of 0 to 500° F.

10. The process of claim 8 wherein the said temperature is a reflux temperature of said solvent.

11. A process for the preparation of an inorganic metal salt-pyridine carboxylic ester complex, comprising reacting an inorganic salt of a metal of group 2B of the periodic system with the diethyl ester of pyridine-2,5-dicarboxylic acid, for a time sufficient to form a complex of said salt and said ester, and recovering said complex as a product of the process.

12. A process for the preparation of an inorganic metal salt-pyridine carboxylic ester complex, comprising reacting an inorganic salt of a metal of group 2B of the periodic system with the di-n-propyl ester of pyridine-2,5-dicarboxylic acid, for a time sufficient to form a complex of said salt and said ester, and recovering said complex as a product of the process.

13. A process for the preparation of an inorganic metal salt-pyridine carboxylic ester complex, comprising reacting an inorganic salt of a metal of group 2B of the periodic system with the ethyl ester of pyridine-3-dicarboxylic acid, for a time sufficient to form a complex of said salt and said ester, and recovering said complex as a product of the process.

14. A process for the preparation of an inorganic metal salt-pyridine carboxylic ester complex, comprising reacting an inorganic salt of a metal of group 2B of the periodic system with the 2-ethyl ester of pyridine-2,5-carboxylic acid, for a time sufficient to form a complex of said salt and said ester, and recovering said complex as a product of the process.

15. A process of claim 11 wherein said complex is a mercuric chloride complex.

References Cited in the file of this patent

UNITED STATES PATENTS 2,118,864   Reppe _____ May 31, 1938